(12) United States Patent  (10) Patent No.: US 8,048,680 B2
Lowe et al.  (45) Date of Patent: Nov. 1, 2011

(54) HOLOGRAPHIC SENSOR

(75) Inventors: Christopher Robin Lowe, Cambridge (GB); Jeffrey Blyth, Cambridge (GB); Satyamoorthy Kabilan, Cambridge (GB); Abid Hussain, Cambridge (GB); Xiaoping Yang, Cambridge (GB); Felicity Kate Sartain, Cambridge (GB); Mei-Ching Lee, Cambridge (GB)

(73) Assignees: Smart Holograms Limited, Cambridge (GB); Cambridge Enterprise Ltd., Cambridge (GB)

( * ) Notice: Subject to any disclaimer, the term of this patent is extended or adjusted under 35 U.S.C. 154(b) by 1504 days.

(21) Appl. No.: 10/545,275

(22) PCT Filed: Feb. 13, 2004

(86) PCT No.: PCT/GB2004/000576
§ 371 (c)(1),
(2), (4) Date: Oct. 17, 2005

(87) PCT Pub. No.: WO2004/081624
PCT Pub. Date: Sep. 23, 2004

(65) Prior Publication Data
US 2006/0063038 A1  Mar. 23, 2006

(30) Foreign Application Priority Data
Mar. 11, 2003 (GB) .................................. 0305587.8

(51) Int. Cl.
*C12P 19/22* (2006.01)
(52) U.S. Cl. .............................. 436/95; 436/94; 422/68.1
(58) Field of Classification Search .................... 436/94, 436/95; 422/68.1
See application file for complete search history.

(56) References Cited

U.S. PATENT DOCUMENTS
5,426,160 A * 6/1995 Bianconi et al. .............. 525/474
(Continued)

FOREIGN PATENT DOCUMENTS
JP  07 304971 A  11/1995
(Continued)

OTHER PUBLICATIONS
Kikuchi et al., "Glucose-Sensing Electrode Coated with Polymer Complex Gel Containing Phenylboronic Acid", Mar. 1 1996, Analytical Chemistry vol. 68 No. 5, pp. 823-828.*

(Continued)

*Primary Examiner* — Michael Marcheschi
*Assistant Examiner* — Jonathan Hurst
(74) *Attorney, Agent, or Firm* — Saliwanchik, Lloyd & Saliwanchik

(57) ABSTRACT

A sensor for the detection of an analyte comprising a cis-diol moiety, which comprises a holographic element comprising a medium and a hologram disposed throughout the volume of the medium, wherein an optical characteristic of the element changes as a result of a variation of a physical property occurring throughout the volume of the medium, and wherein the medium is a polymer comprising a group of formula (I): wherein n is 0, 1, 2, 3 or 4; each X (if present) is independently is an atom or group which, via an electronic effect, promotes formation of a tetrahedral geometry about the boron atom; and Y is a spacer which, when n is 0 or otherwise optionally, is an atom or group which, via an electronic effect, promotes formation of a tetrahedral geometry about the boron atom. Such a sensor may be used for the detection of glucose.

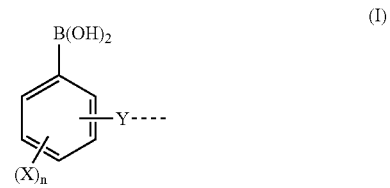

(I)

11 Claims, 4 Drawing Sheets

U.S. PATENT DOCUMENTS

| | | | |
|---|---|---|---|
| 5,478,575 A * | 12/1995 | Miyazaki et al. | 424/487 |
| 5,631,364 A * | 5/1997 | Sundrehagen et al. | 540/128 |
| 5,989,923 A | 11/1999 | Lowe et al. | |
| 6,653,141 B2 * | 11/2003 | Singaram et al. | 436/95 |
| 2002/0094586 A1 * | 7/2002 | Daniloff et al. | 436/518 |

FOREIGN PATENT DOCUMENTS

| | | |
|---|---|---|
| WO | WO 90/15995 A1 | 12/1990 |
| WO | WO 03/087899 A1 | 10/2003 |

OTHER PUBLICATIONS

Asher et al., "Photonic Crystal Carbohydrate Sensors: Low Ionic Strength Sugar Sensing", Feb. 22, 2003, J. Am. Chem. Soc., 125, pp. 3322-3329.*

Shiino et al., "Amine containing phenylboronic acid gel for glucose-responsive insulin release under physiological pH", 1995, Journal of Controlled Release, 37, pp. 269-276.*

* cited by examiner

HOLOGRAPHIC SENSOR

This application is a National Stage Application of International Application Number PCT/GB2004/000576, filed Feb. 13, 2004; which claims priority to Great Britain Application No. 0305587.8, filed Mar. 11, 2003.

FIELD OF THE INVENTION

This invention relates to a holographic sensor.

BACKGROUND OF THE INVENTION

WO-A-95/26499 discloses a holographic sensor, based on a volume hologram. The sensor comprises a holographic element, the element comprising an analyte-sensitive holographic support medium having an optical transducing structure disposed throughout its volume. Because of this physical arrangement of the transducer, the optical signal generated by the sensor is very sensitive to volume changes or structural rearrangements taking place in the analyte-sensitive matrix as a result of interaction or reaction with the analyte. For example, a sensor comprising a gelatin-based holographic medium may be used to detect trypsin. Trypsin acts on the gelatin medium, irreversibly destroying the integrity of the holographic support medium.

WO-A-031087899 describes a method for the continuous detection of an analyte in a fluid involving the use of a holographic sensor. The support medium of the sensor comprises a group which is capable of reacting reversibly with the analyte. Thus, when fluid is passed over the holographic element, any analyte present can be detected continuously.

In particular, WO-A-031087899 describes how a holographic sensor formed by the polymerisation of monomers including vinylphenylboronic acid may be used to detect glucose. The pendant phenylboronic acid groups can react reversibly with a cis-diol group of glucose, resulting in swelling of the holographic support medium. A limitation of this technology is that the sensor is only effective over a limited pH range; there remains the need for sensors which can detect glucose continuously over a range of conditions, in particular physiological conditions.

SUMMARY OF THE INVENTION

When a cis-diol-containing species binds a boronic acid, $RB(OH)_2$, an unstable boronate ester results, the ester having a trigonal planar conformation. The boronate ester normally achieves stability by binding an electron-donating group, to form a more stable, tetrahedral geometry. Typically, boronic acids attain this tetrahedral geometry by binding $OH^-$, forming negatively-charged boronate esters. At relatively high pH, the mechanism is believed to be slightly different. It is thought that the boronic acid first binds $OH^-$, to form tetrahedral $RB(OH)_3^-$, which then reacts with the cis-diol. The tetrahedral $RB(OH)_3^-$ reacts more readily with a cis-diol than the trigonal planar boronate ester.

Without wishing to be bound by theory, the inventors believe that the glucose sensor of WO-A-03/087899 "works" because the formation of a negatively-charged phenylboronate ester produces a Donan potential, causing water to partition into the support medium. Expansion of the medium is then observed as a shift in the reflectance maxima to longer wavelengths. At low pH values, the boronic acid groups may be unable to form negatively-charged phenylboronate esters and, as a result, detection might not possible. This is probably why the glucose sensor of WO-A-03/087899 is only effective over a limited pH range.

The invention is based on the discovery of a class of phenylboronic acid derivatives which allow for the detection of glucose and other cis-diol-containing analytes across a wide range of pH values. The inventors have realised that phenylboronic acids can be modified to promote formation of a more reactive tetrahedral conformation.

For example, the phenyl group may comprise one or electron-withdrawing substituents which, by mediating their electronic effects through the phenyl ring, promote formation of $RB(OH)_3^-$. As another example, a substituent may be capable of forming an intramolecular bond with the boron atom, forcing the boronate into a substantially tetrahedral conformation. Judicial selection of substituents allows the responsiveness of the sensor to be optimized with respect to a particular set of detection conditions.

Accordingly, a first aspect of the invention is a sensor for the detection of an analyte comprising a cis-diol moiety, which comprises a holographic element comprising a medium and a hologram disposed throughout the volume of the medium, wherein an optical characteristic of the element changes as a result of a variation of a physical property occurring throughout the volume of the medium, and wherein the medium comprises a polymer comprising a group of formula (i)

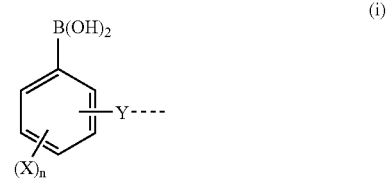

wherein
  n is 0, 1, 2, 3 or 4;
  each X (if present) is independently is an atom or group which, via an electronic effect, promotes formation of a tetrahedral geometry about the boron atom; and
  Y is a spacer which, when n is 0 or otherwise optionally, is an atom or group which, via an electronic effect, promotes formation of a tetrahedral geometry about the boron atom.

Such a sensor can be used in a method for the detection of an analyte comprising a cis-diol moiety in a fluid, which comprises contacting the fluid with the holographic element and detecting any change of the optical characteristic of the element. The analyte may comprise a plurality of cis-diol moieties; examples of such analytes include glucose and tartaric acid (tartarate).

The polymeric medium may be obtained by the polymerisation of monomers including a compound of formula (I)

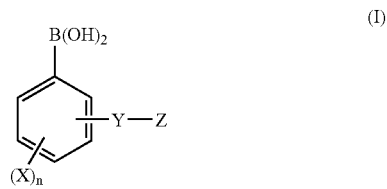

wherein
  X, Y and n are as defined above; and
  Z is a polymerisable group.

Another aspect of the invention is a device for the detection of an analyte comprising a cis-diol moiety in a fluid, which comprises a fluid conduit having an inlet, an outlet, and a holographic element as defined above over which the fluid can flow, wherein the device also includes a window whereby non-ionizing radiation can irradiate the holographic element. The analyte concentration may change, while the fluid is static. Alternatively, the fluid may be passed continuously over the element.

The variation arises as a result of reaction between the medium and the cis-diol moiety of the analyte, wherein the reaction and the variation are reversible. Since both the reaction and the reverse reaction can occur, analytes such as glucose can be continuously detected, possibly in real time.

A sensor of the invention may be used to monitor a reaction in viva or in vitro, e.g. in a fermenter. It can be used for kinetic measurement, and as an effective control system. The sensor may be used, for example, to detect hyperglycaemia or hypoglycaemia.

DESCRIPTION OF THE PREFERRED EMBODIMENTS

Figure 1:
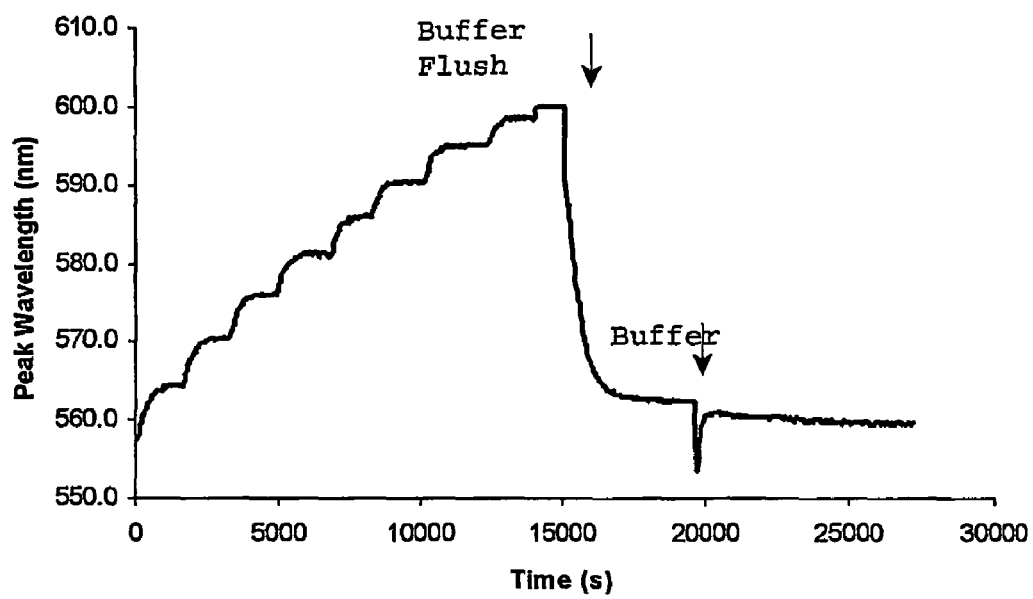
FIG. 1 shows the response of the hologram in terms of peak diffraction wavelength readings.

In addition to their use in holographic sensors, the present invention also encompasses the novel phenylboronic acid compounds themselves. Certain compounds and combinations of substituents are preferred; in particular, see the subclaims.

The term "alkyl" as used herein refers to a straight or branched chain alkyl moiety having from one to six carbon atoms. The term includes, for example, methyl, ethyl, propyl, isopropyl, butyl, tert-butyl, pentyl, hexyl and the like.

The term "alkoxy" as used herein refers to a straight or branched chain alkoxy moiety having from one to six carbon atoms. The term includes, for example, methoxy, ethoxy, propoxy and the like.

The term "halogen" as used herein refers to fluorine, chlorine, bromine or iodine.

The term "electronic effect" as used herein refers to a direct or indirect effect on the boronic acid group, which promotes formation of a tetrahedral conformation about the boron atom relative to phenylboronic acid. The atom or group may, for example, have an electron-withdrawing, electron-donating, resonance or mesomeric effect on the phenyl ring of formulae (i) and (l) which, in turn, effects the boronic acid group.

The phenyl ring is preferably substituted with one or more electron-withdrawing groups. In this way, formation of $RB(OH)_3^-$ may be promoted. When $RB(OH)_3^-$ reacts with a cis-diol group of glucose, the resulting negatively-charged phenylboronate ester produces a Donan potential, causing water to partition into the support medium. Expansion of the medium is then observed as a shift in the reflectance maxima to longer wavelengths. In general, most sensors of the invention will detect cis-diol-based analytes in this way.

Particularly when the analyte comprises a plurality of cis-diol groups, it is preferred that the phenyl ring is substituted with a group comprising an atom having a lone pair of electrons, which can form an intramolecular (e.g. coordinate) bond with the boron atom, forcing it into a tetrahedral conformation. The boronic acid group may, as a result, be highly reactive. An example of such a group is illustrated below:

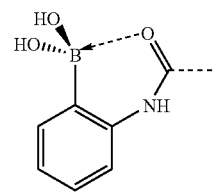

Although such a group is highly reactive to cis-diols, it is thought to form an uncharged phenylboronate ester which, as it is uncharged, cannot produce a Donan potential. Instead, it is believed that, when the analyte comprises a plurality of cis-diol moieties, it can bind two of these highly reactive phenylboronic acid groups and effectively cross-link the support medium. This cross-linking of the support medium causes it to contract, resulting in a shift in the replay wavelength. Examples of analytes which can be detected in this way are glucose and tartarate (tartaric acid).

The interaction between the medium and analyte can be detected remotely, using non-ionizing radiation. The extent of interaction is reflected in the degree of change of the physical property, which is detected as a variation in an optical characteristic, preferably a shift in wavelength of non-ionizing radiation.

The property of the holographic element which varies may be its charge density, volume, shape, density, viscosity, strength, hardness, charge, hydrophobicity, swellability, integrity, cross-link density or any other physical property. Variation of the or each physical property, in turn, causes a variation of an optical characteristic, such as polarisability, reflectance, refractance or absorbance of the holographic element.

The hologram may be disposed on or in, part of or throughout the bulk of the volume of the support medium. An illuminating source of non-ionizing radiation, for example visible light, may be used to observe variation(s) in the, or each, optical characteristic of the holographic element.

More than one hologram may be supported on, or in, a holographic element. Means may be provided to detect the or each variation in radiation emanating from the or each hologram, arising as a result of a variation in the or each optical characteristic. The holographic elements may be dimensioned and arranged so as to sense two or more independent events/species and to affect, simultaneously, or otherwise, radiation in two or more different ways. Holographic elements may be provided in the form of an array.

Preferred groups of formula (i) include:

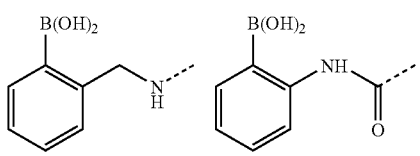

-continued

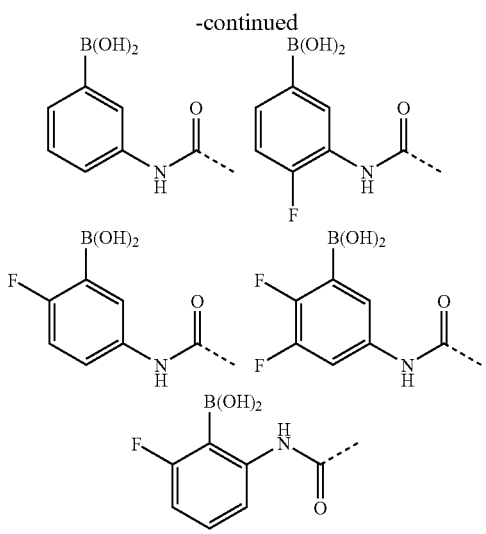

The holographic support medium may be obtained by the polymerisation of monomers, wherein the monomers include a compound of formula (I).
Preferred monomers include:
2-(4-(acrylamidomethyl)phenylamino)methyl)phenylboronic acid;
2-((3-methacrylamidopropylamino)methyl)phenylboronic acid;
2-acrylamido-phenylboronic acid;
3-acrylamido-phenylboronic acid; and
3-acrylamido-6-fluoro-phenylboronic acid.

In addition to a compound of formula (I), the monomers may include (meth)acrylamide and/or (meth)acrylate-derived co-monomers. In particular, the monomer HEMA (hydroxyethyl methacrylate) is readily polymerisable and cross-linkable. PolyHEMA is a versatile support material since it is swellable, hydrophilic and widely biocompatible. The monomers may also include co-monomers having groups which are capable of intermolecular electron-donation, for example secondary of tertiary amines.

Other examples of holographic support media which may be modified to include boronate group are gelatin, K-caraggeenan, agar, agarose, polyvinyl alcohol (PVA), sol-gels (as broadly classified), hydro-gels (as broadly classified), and acrylates.

A parameter determining the response of a holographic element is the extent of cross-linking. The number of cross-linking points due to polymerisation of monomers should not be so great that complex formation between polymer and analyte-binding groups is relatively low, since the polymer film may become too rigid. This may inhibit the swelling of the support medium.

The following Examples illustrate the invention, in conjunction with the accompanying drawings.

EXAMPLE 1

3-Acrylamido-phenylboronic acid ("3-APB") was synthesized by reacting 3-amino phenylboronic acid with an excess of acryloyl chloride in an aqueous alkaline solution. The product was extracted in acetone and dried using a rotary evaporator. The structure of 3-APB was confirmed using NMR. The purity was about 90%, TLC showing very little contamination.

3-APB was then copolymerized with acrylamide and N,N'-methylene bisacrylamide, and a hologram recorded within the polymer material. The response to glucose was then tested by increasing the glucose concentration in phosphate-buffered saline (PBS) solution at pH 7.4 in 0.5 mM steps.

FIG. 1 shows the response of the hologram in terms of peak diffraction wavelength readings. The reaction with glucose was fully reversible after the system was flushed twice with fresh buffer. The sensor was also sensitive enough to pick up concentrations of glucose as low as 0.5 mM (9 mg %) with a shift of about 6 nm. This result was highly reproducible with errors of about 5%, even when using a different hologram and instrumentation.

Figure 2:
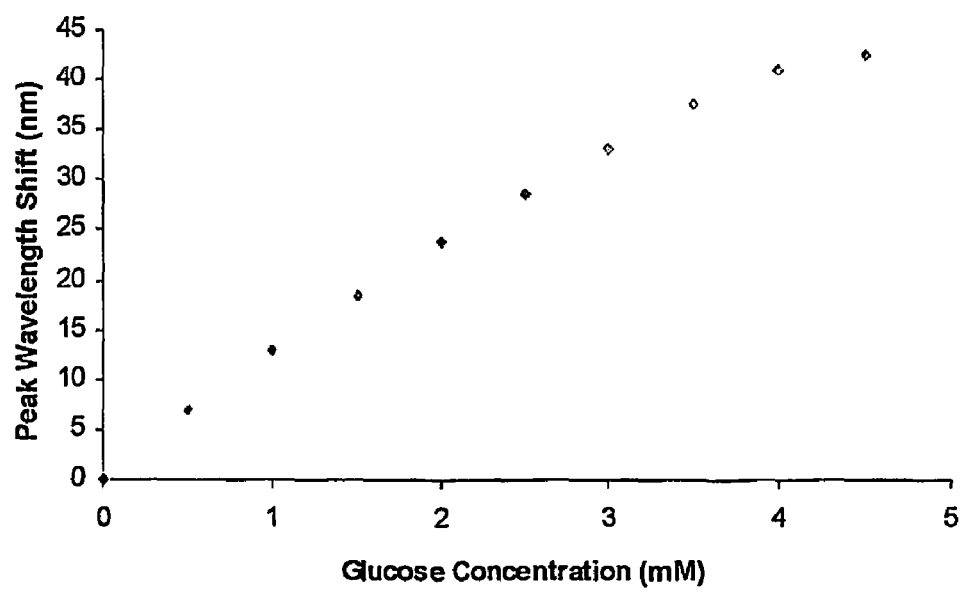
FIG. 2 shows a calibration curve.

FIG. 2 shows the calibration curve. The calibration was approximately linear below 2 mM (36 mg %) glucose.

Figure 3:
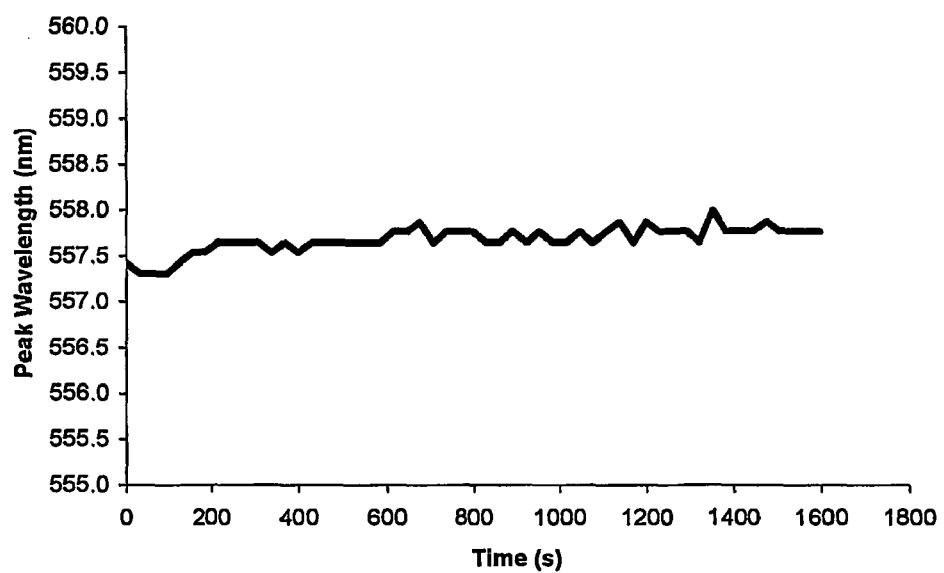
FIG. 3 shows that the addition of salt had no significant effect on the hologram, showing that it could easily tolerate small changes in salt concentration.

A control was also run where 2 mM KCl was added to the system containing the hologram in PBS pH 7.4 instead of glucose. This was to test the tolerance of the hologram to changes in osmolarity; an increase in osmolarity could lead to a contraction of the polymer. As shown in FIG. 3, addition of the salt had no significant effect on the hologram, showing that it could easily tolerate small changes in salt concentration.

EXAMPLE 2

3-APB, the synthesis of which is described in Example 1, was recrystallised from an aqueous ethanolic solution with a purity of about 98%; both NMR and TLC showed that there were no contaminants present.

3-APB was co-polymerized with acrylamide and N,N'-methylene bisacrylamide to form a polymer comprising about 15 mole % of purified 3-APB and about 1.55 mole % N,N'-methylene bisacrylamide (cross-linker). A hologram was then recorded in the polymer.

Figure 4:
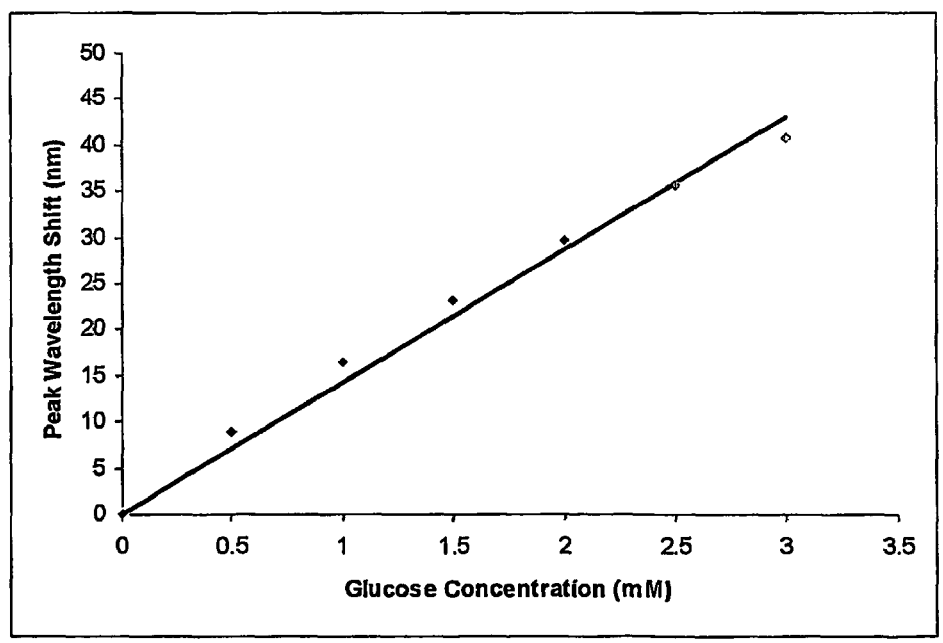
FIG. 4 shows a calibration curve for response to glucose in PBS pH 7.4 at 30° C.

A calibration curve for response to glucose in PBS pH 7.4 at 30° C. is shown in FIG. 4. The purified 3-APB had a response of about 14 nm per millimolar glucose whereas the 90% pure 3-APB of Example 1 had a response of only 1 nm per millimolar glucose for a hologram with the same mole % of 3-APB.

Figure 5:
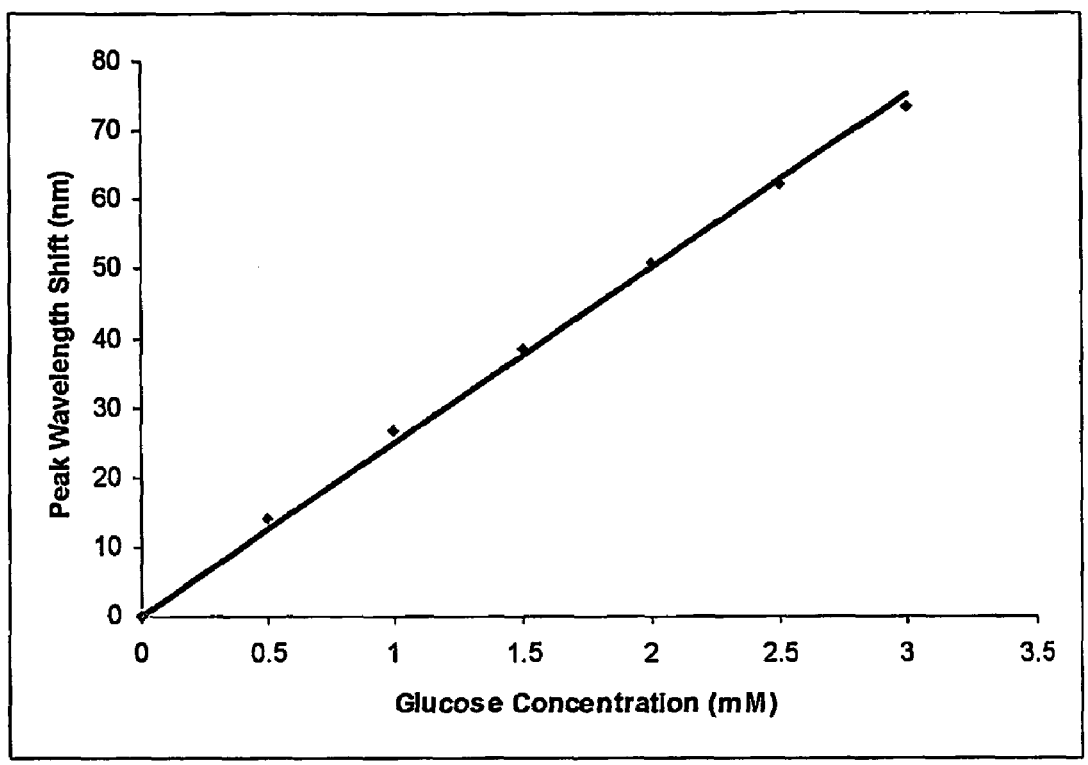
FIG. 5 shows a calibration curve.

A polymer comprising a 3-APB molar fraction of 25% was synthesized using the same amount of cross-linker (1.55 mole %) and the same amount of solids per unit volume of solvent. A hologram was recorded within the polymer and then calibrated. The calibration curve is shown in FIG. 5.

The increased amount of 3-APB increased the sensitivity of the hologram for glucose by over 70%. This allowed small changes in glucose concentration to be accurately detected.

EXAMPLE 3

2-Acrylamido-phenylboronic acid ("2-APB") was synthesized by reacting 2-aminophenylboronic acid with an excess of acryloyl chloride in an aqueous alkaline solution. The product was extracted in acetone and dried using a rotary evaporator. The structure of 2-APB was confirmed using NMR. The purity was shown to be greater than 90%.

2-APB was then copolymerized with acrylamide and N,N'-methylene bisacrylamide to form a co-polymer with 20% 2-APB and 1.5% N,N'-methylene bisacrylamide (cross-linker). A hologram was then recorded within the polymeric medium. The resulting holographic sensor was then tested for its response to glycerol, ethylene glycol, lactate, tartaric acid and glucose. Testing was conducted using PBS (pH 7.4) at 30° C.

Figure 6:
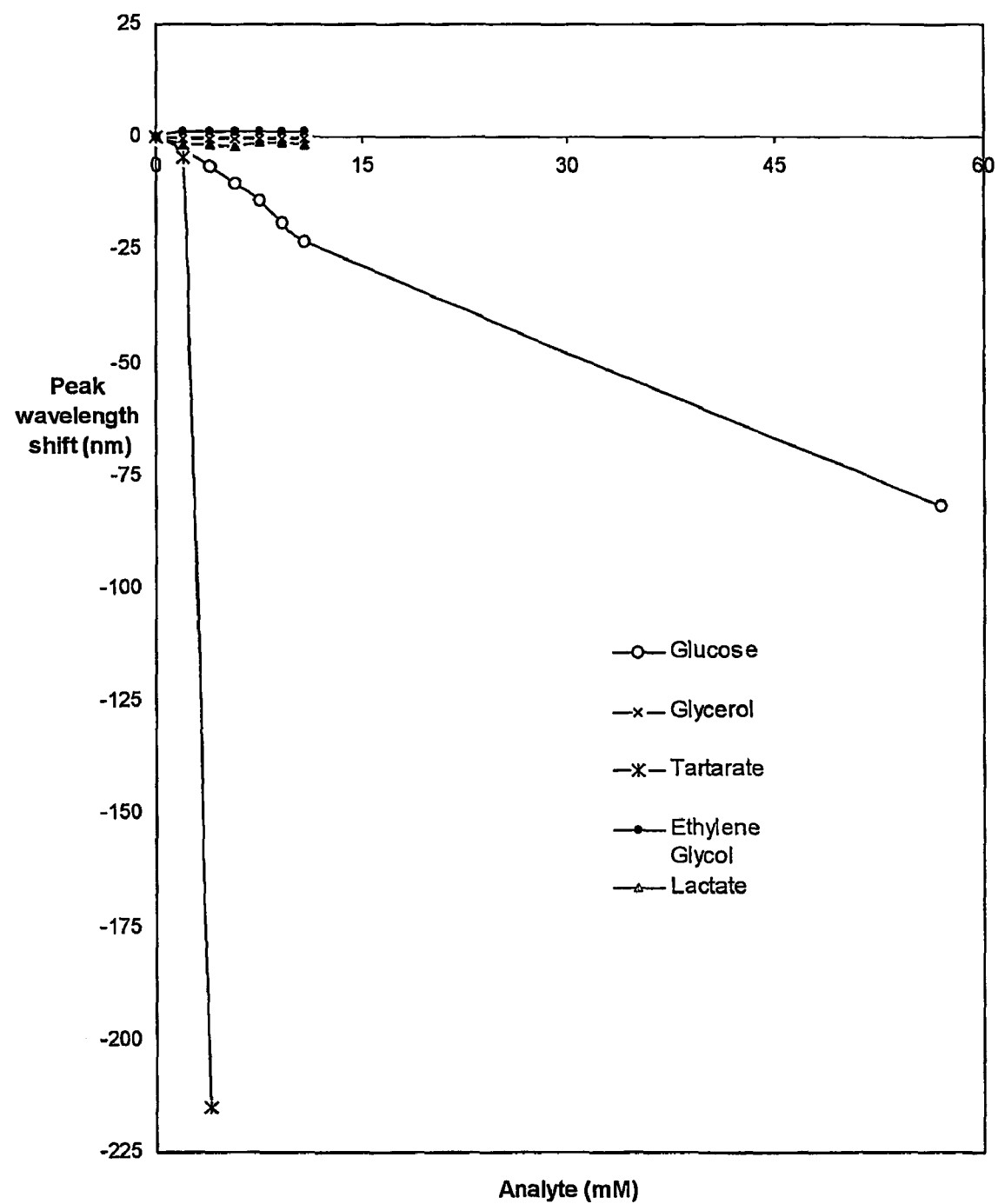
FIG. 6 shows the response of the sensor to the five analytes.

The response of the sensor to the five analytes is shown in FIG. 6. It is evident that the sensor is unresponsive to changes in glycerol, ethylene glycol and lactate concentration. The sensor is, however, sensitive to change in the levels of tartaric acid and glucose; this was observed as a blue shift in the peak diffraction wavelength, indicating that the support medium contracted in the presence of these analytes.

This selectivity to tartaric acid and glucose is believed to be attributable to the fact that both these analytes contain two cis-diol groups; the other analytes tested contain only one. Thus, tartaric acid and glucose can bind two 2-APB groups and, effectively, cross-link the holographic support medium, causing it to contract.

The response to tartaric acid is greater than for glucose because the two cis-diol sites of tartarate are identical and thus of equal affinity for 2-APB. The cis-diol sites of glucose are slightly different. If such a sensor were to be used to monitor physiological levels of glucose, then the greater response to tartaric acid would not be a problem since the latter is not found free in solution in the body.

The invention claimed is:

1. A method for the detection of an analyte comprising a cis-diol moiety in a fluid, which comprises contacting the fluid with a holographic element comprising a medium and a hologram disposed throughout the volume of the medium, wherein an optical characteristic of the element changes as a result of contraction of the medium due to binding of the cis-diol moiety, and wherein the medium comprises a polymer comprising a group of formula (i)

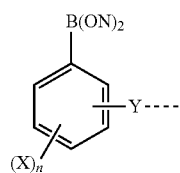

wherein
n is 1, 2, 3 or 4;
each X is independently an atom or group which, via an electronic effect, promotes formation of a tetrahedral geometry about the boron atom; and
Y is a spacer which, is o- relative to —B(OH)$_2$ and is an atom or group which, via an electronic effect, promotes formation of a tetrahedral geometry about the boron atom; and detecting the change of the optical characteristic of the element.

2. The method according to claim 1, wherein any change of the optical characteristic is detected as a colour change.

3. The method according to claim 1, wherein the contacting comprises passing the fluid continuously over the element.

4. The method according to claim 1, for the detection of glucose.

5. The method according to claim 1, for the detection of tartaric acid.

6. A method for the detection of an analyte comprising a cis-diol moiety in a fluid, which comprises contacting the fluid with a holographic element comprising a medium and a hologram disposed throughout the volume of the medium, wherein an optical characteristic of the element changes as a result of contraction of the medium due to binding of the cis-diol moiety, and wherein the medium comprises a polymer comprising a group of formula (ii)

wherein Y is a spacer which is o- relative to —B(OH)$_2$ which is an atom or group which, via an electronic effect, promotes formation of a tetrahedral geometry about the boron atom; and
wherein Y comprises an atom having a lone pair of electrons which is capable of forming an intramolecular bond with B;
and detecting the change of the optical characteristic of the element.

7. The method according to claim 6, wherein the medium consists essentially of the polymer comprising the group of formula (ii).

8. The method according to claim 7, wherein the medium consists of the polymer comprising the group of formula (ii).

9. The method according to claim 1, wherein the medium consists essentially of the polymer comprising the group of formula (i).

10. The method according to claim 9, wherein the medium consists of the polymer comprising the group of formula (i).

11. The method according to claim 1, wherein Y comprises an atom having a lone pair of electrons which is capable of forming an intramolecular bond with B.

* * * * *

UNITED STATES PATENT AND TRADEMARK OFFICE
CERTIFICATE OF CORRECTION

PATENT NO. : 8,048,680 B2
APPLICATION NO. : 10/545275
DATED : November 1, 2011
INVENTOR(S) : Christopher Robin Lowe et al.

It is certified that error appears in the above-identified patent and that said Letters Patent is hereby corrected as shown below:

Column 7,

Lines 30-40 "

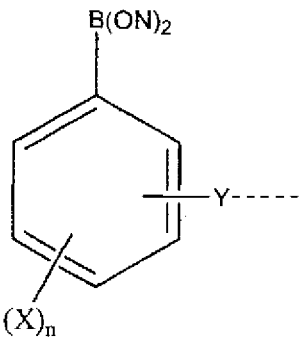

"

should read --

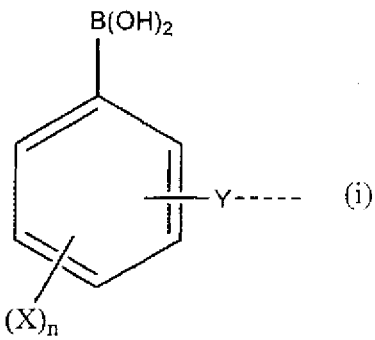

--

Column 8,
Lines 26 and 27 "to –B(OH)$_2$ which" should read --to –B(OH)$_2$ and which--

Signed and Sealed this
Twentieth Day of December, 2011

David J. Kappos
*Director of the United States Patent and Trademark Office*